United States Patent [19]

Kimura et al.

[11] Patent Number: 5,257,573
[45] Date of Patent: Nov. 2, 1993

[54] APPARATUS FOR MANUFACTURING WRAPPED FOOD

[75] Inventors: Shigemi Kimura; Ikuhiro Nishida; Toshihiro Hayashi, all of Tokyo, Japan

[73] Assignee: Asahi Denka Kogyo Kabushiki Kaisha, Tokyo, Japan

[21] Appl. No.: 832,572

[22] Filed: Feb. 7, 1992

[30] Foreign Application Priority Data

Feb. 19, 1991 [JP] Japan .................. 3-046130

[51] Int. Cl.⁵ .................. A21C 3/06; A21C 9/00; A21C 11/00
[52] U.S. Cl. .................. 99/450.2; 99/450.1; 99/450.6; 425/321; 425/364 R
[58] Field of Search .......... 99/352, 353, 494, 450.1, 99/450.2, 450.6, 450.7, 450.8, 443 C; 425/162, 305.1, 321, 335, 372, 371, 391, 364 R; 426/392, 500, 512

[56] References Cited

U.S. PATENT DOCUMENTS

| 2,450,033 | 9/1948 | Cohen ................... 99/450.1 |
| 3,704,664 | 12/1972 | Fisher, Jr. ............. 99/450.2 |
| 3,861,291 | 1/1975 | Guzaski ................. 99/450.2 |
| 4,171,197 | 10/1979 | Sato .................... 99/353 X |
| 4,608,919 | 9/1986 | Prows et al. ............ 99/450.6 |
| 4,638,729 | 1/1987 | Woodworth et al. ........ 99/450.6 |
| 4,741,263 | 5/1988 | Ueno et al. ............. 425/335 X |
| 4,767,638 | 8/1988 | Uhrovic ................. 426/500 |
| 4,880,375 | 11/1989 | Hayashi ................. 425/364 R |
| 4,905,583 | 3/1990 | Hayashi ................. 99/450.2 |
| 4,976,600 | 12/1990 | Willett ................. 425/321 X |

FOREIGN PATENT DOCUMENTS

| 755365 | 3/1967 | Canada ................. 425/364 R |
| 592196 | 9/1947 | United Kingdom ......... 425/364 R |

Primary Examiner—Timothy F. Simone
Attorney, Agent, or Firm—Young & Thompson

[57] ABSTRACT

Apparatus for manufacturing a spindle-shaped wrapped food (10) by squeezing both end portions of a cylindrical wrapped food (10A) having an extra portion at each end of a membraneous food (12) with a filling member (11) enwrapped therein using an apparatus including an endless conveyor device (20) having a mechanism for pushing up an endless belt (21) with both edges thereof inclined, a stationary resistance plate (23) juxtaposed along and above the endless belt (21) of the endless conveyor device (20) and having a downwardly inclined portion (25) at each edge thereof, and a pair of auxiliary resistance portions (26) directed toward gaps S formed between both side edges of the stationary resistance plate (23) and both side edges of the endless belt (21) respectively, a space formed between the endless belt (21) and the stationary resistance plate (23) being of a generally spindle shape in section. The cylindrical wrapped food (10A) is loaded on the endless belt (21) and conveyed while rotating the food (10A) between the endless belt (21) and the stationary resistance plate (23). The pair of auxiliary resistance portions (26) contact both end portions of the membraneous food (12) to exert resistance to rotation of the cylindrical wrapped food (10A) to twist the extra portions in order to roll both extra portions in both end portions of the wrapped food (10A).

4 Claims, 4 Drawing Sheets 5,257,573

1

APPARATUS FOR MANUFACTURING WRAPPED FOOD

BACKGROUND OF THE INVENTION

1. Field of the Invention

This invention relates to apparatus for manufacturing a wrapped food composed of a filling material such as sweet potato, butter cream, jam, or potato salad, which is wrapped with a membraneous food such as a crust of crepe and formed into a spindle shape by squeezing both ends thereof.

2. Description of the Prior Art

The conventional process for manufacturing a spindle-shaped wrapped food of this type is comprised of the steps of enwrapping a filling material into a cylindrical state with a membraneous food such that the membraneous food with the filling material filled therein has an extra portion at each end thereof, then enwrapping this cylindrical wrapped food with a resin film or an aluminum foil, and thereafter squeezing both ends thereof by twisting to form a spindle shape.

However, the above conventional process for manufacturing a wrapped food is often employed when a wrapped food is to be manually manufactured. Where a wrapped food is manufactured manually, manufacturing efficiency is deteriorated and economic efficiency is inferior.

In case a wrapped food of this type is mechanically manufactured, in order to mechanically carry out the steps of enwrapping a cylindrical wrapped food with a resin film or an aluminum foil and then squeezing both ends thereof by twisting, the apparatus is obliged to become very large and is not necessarily economical. Therefore, another process for manufacturing a spindle-shaped wrapped food was contemplated, which comprises the steps of loading a cylindrical wrapped food having an extra portion of a membraneous food at each end thereof on an endless conveyor device of a manufacturing apparatus including the endless conveyor device having a push mechanism for pushing up each end thereof, and a stationary resistance plate disposed above the endless conveyor device, both ends of the stationary resistance plate each having an inclined portion inclining downward in correspondence with the push mechanism, and squeezing each end by rotationally moving the same with each end of the cylindrical wrapped food sandwiched between the two. However, in a manufacturing process using such apparatus as mentioned, both end portions of the filling material as a filler can be squeezed, but the membraneous food as a crest portion can not be squeezed (or even if it can be squeezed, it tends to restore to its original shape), with the result that the wrapped food cannot be formed in a spindle shape.

SUMMARY OF THE INVENTION

An object of the present invention is to provide an apparatus for manufacturing a wrapped food by forming a filling material into a spindle shape, squeezing both ends with extra portions on both ends of a membraneous food rolled in both end portions of a wrapped food, so that the extra portions of the membraneous food are not restored to original shapes and the spindle shape is surely maintained as a whole.

The present invention has achieved the above object by providing an apparatus for manufacturing a spindle-shaped wrapped food 10 by squeezing both end portions of a cylindrical wrapped food 10A having an extra portion at each end of a membraneous food 12 with a filling member 11 enwrapped therein using an apparatus including an endless conveyor device 20 having a mechanism for pushing up an endless belt 21 with both edges thereof inclined, a stationary resistance plate 23 juxtaposed along and above said endless belt 21 of said endless conveyor device 20 and having a downwardly inclined portion 25 at each edge thereof, and a pair of auxiliary resistance portions 26 directed toward gaps S formed between both side edges of said stationary resistance plate 23 and both side edges of said endless belt 21 respectively, the space formed between said endless belt 21 and said stationary resistance plate 23 being of a generally spindle shape in section, wherein said the food is loaded on said endless belt 21 and transferred while rotating between said endless belt 21 and said stationary resistance plate 23, and contacting said pair of auxiliary resistance portions 26 to the respective extra portions of said both end portions of said membraneous food 12 to exert resistance to rotation of said cylindrical wrapped food 10A to twist said extra portions in order to roll said both extra portions in said both end portions of said wrapped food 10A.

According to the present invention, when a cylindrical wrapped food composed of a filling material wrapped with a membraneous food and having an extra portion at each end portion of the membraneous food is loaded on an endless conveyor device, rotational movement is exerted on the cylindrical wrapped food between the endless conveyor device and a stationary resistance plate, and a pair of auxiliary resistance portions are brought into contact with the respective extra portions at both end portions of the membraneous food to exert resistance to the rotation so that the extra portions are twisted and rolled in both end portions of the wrapped food thereby to squeeze both end portions of the wrapped food to form a spindle-shaped wrapped food, all during the time the cylindrical wrapped food is being transferred by the endless conveyor device.

DETAILED DESCRIPTION OF THE EMBODIMENT

The present invention will be described with reference to the embodiment shown in FIGS. 1 through 7 inclusive.

A manufacturing apparatus used in one preferred embodiment of the present invention will be described first. The manufacturing apparatus used in this embodiment is an apparatus for manufacturing a spindle-shaped wrapped food 10 by squeezing extra portions 12A at both end portions of a membraneous food 12 from a cylindrical wrapped food 10A, as will be described, composed of a filling material 11 wrapped with the membraneous food 12.

Figure 1:
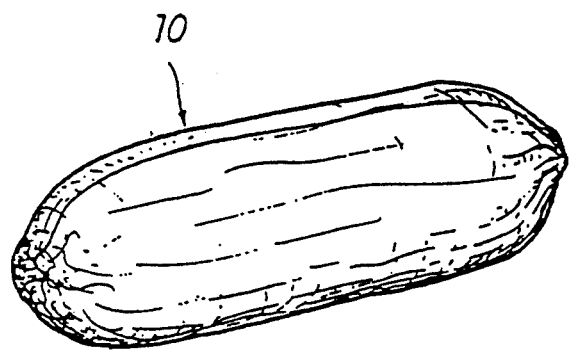
FIG. 1 is a perspective view showing a spindle-shaped wrapped food which is manufacturing with one preferred embodiment of apparatus for manufacturing a wrapped food according to the present invention.
Figure 2:
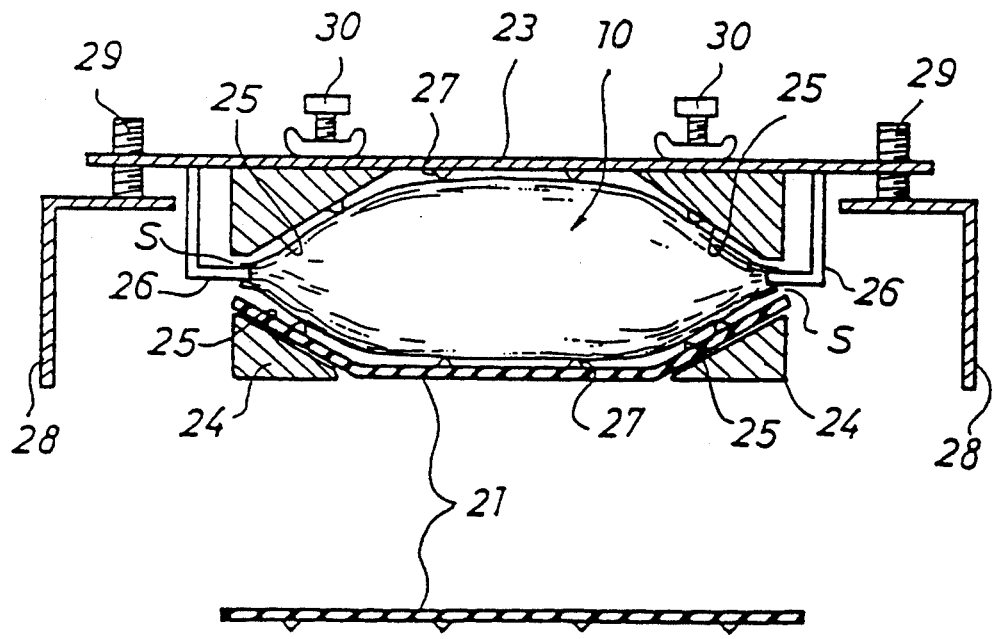
FIG. 2 is a widthwise sectional view showing a manufacturing state of a wrapped food by a manufacturing apparatus preferably used in one embodiment of a process for manufacturing a wrapped food according to the present invention.
Figure 3:
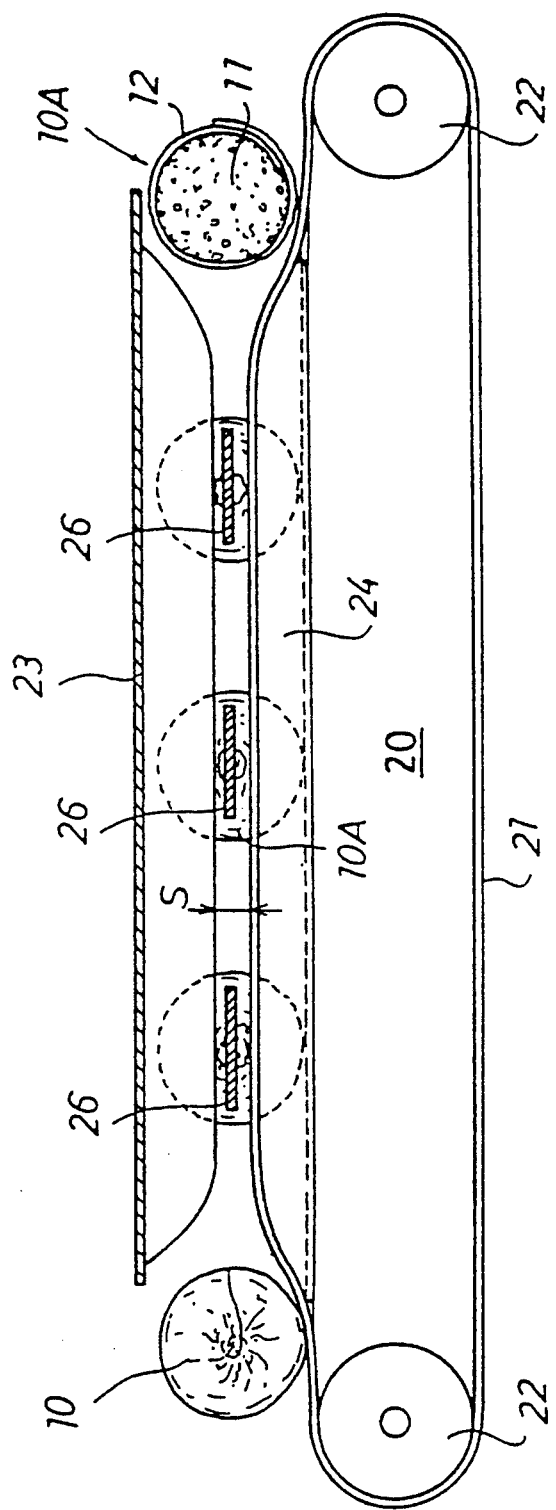
FIG. 3 is a side view of the manufacturing apparatus shown in FIG. 2.
Figure 4:
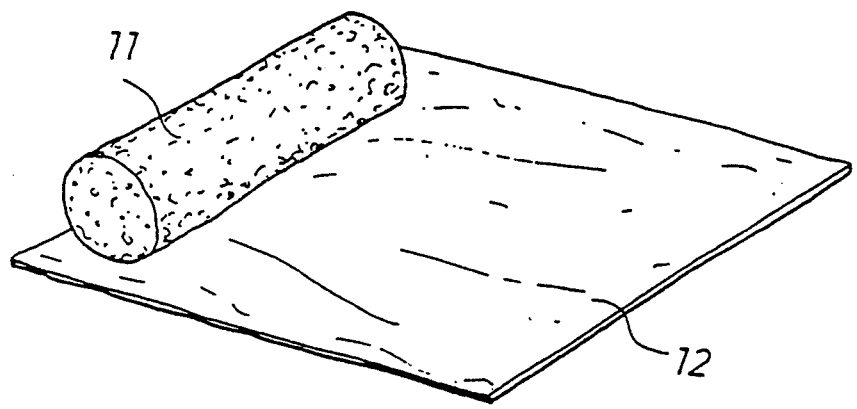
FIG. 4 is a perspective view showing a membraneous food with a filling material deposited thereon.

This manufacturing apparatus includes an endless belt 21 for transferring thereon the cylindrical wrapped food 10A wrapped with the membraneous food 12, a conveyor device 20 having a pair of front and rear rollers 22, 22 with the endless belt 21 looped therearound, and a stationary resistance plate 23 stationarily disposed between the rollers 22, 22 of the conveyor device 20 and above and along the endless belt 21 in such a manner as to form a gap S slightly narrower than the size of the cylindrical wrapped food 10A, the cylindrical food 10A being sandwiched between the endless belt 21 and the stationary resistance plate 23. Furthermore, the lower surfaces of both side edge portions of the endless belt 21 are provided with a pair of right and left guide portions 24, 24 adapted to raise both end portions of the endless belt 21 outwardly at angles along the longitudinal axis thereof, and the lower surfaces of both side edge portions of the stationary resistance plate 23 are provided with inclined surfaces 25, 25 inclining downwardly from the inner sides to the outer sides of both side edge portions along the longitudinal axis thereof. Formed respectively between the outer ends of the guide portions 24, 24 and the outer ends of the inclined portions 25, 25, are gaps S, S as shown in FIGS. 2 and 3. Accordingly, the gap S, which is formed by being surrounded by the endless belt 21 with both side edge portions thereof raised by the pair of guide portions 24, 24, the stationary resistance plate 23 and the pair of inclined portions 25, 25, is formed in a generally spindle shape in widthwise section as shown in FIG. 2. Such gap S as mentioned above is provided on both right and left sides thereof with three pairs of auxiliary resistance portions 26, 26 arranged at predetermined spaces in the longitudinal direction and adapted to contact the extra portions 12A, 12A of the membraneous food 12 of the wrapped food 10A.

The entire surfaces of the endless belt 21, stationary resistance plate 23 and inclined portions 25, 25 are provided with needle-shaped projections 27, so that the cylindrical wrapped food 10A is not slipped while the food 10A is being transferred by the endless belt 21.

The stationary resistance plate 23, as shown in FIG. 2, is level adjustably fixed at both ends thereof with respect to cradles 28, 28 disposed at both sides of the endless belt 21 by fastening tools 29, 29 such as bolts or the like. The level of the stationary resistance plate 23 can be adequately adjusted in accordance with the size of the wrapped food 10 to be manufactured.

Figure 5:
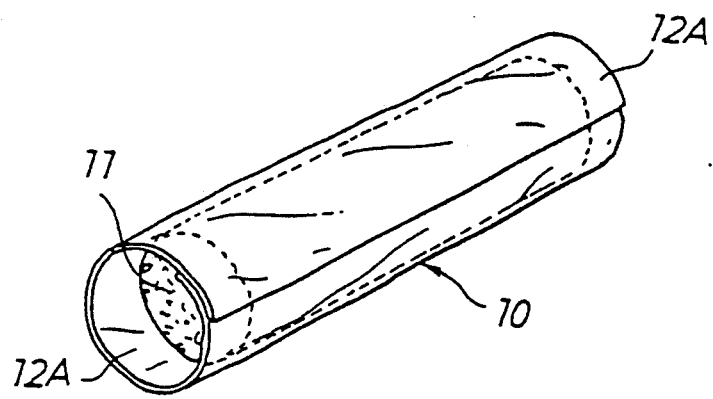
FIG. 5 is a perspective view showing a cylindrical wrapped food composed of the filling material wrapped with the membraneous food of FIG. 4.
Figure 6:
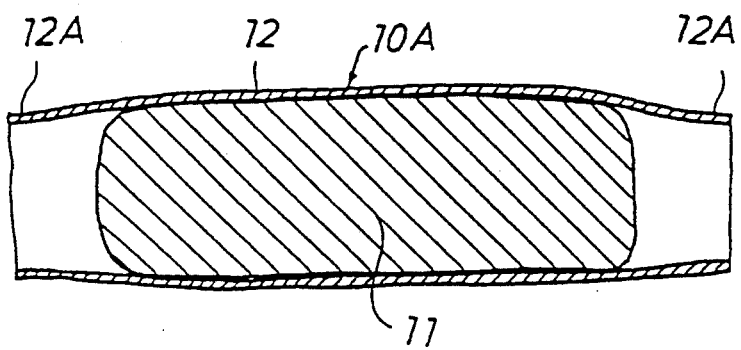
FIG. 6 is a longitudinal sectional view of a cylindrical food showing an early stage of the manufacturing process, wherein both end portions of a membraneous food is squeezed by the manufacturing apparatus of FIGS. 2 and 3.
Figure 7:
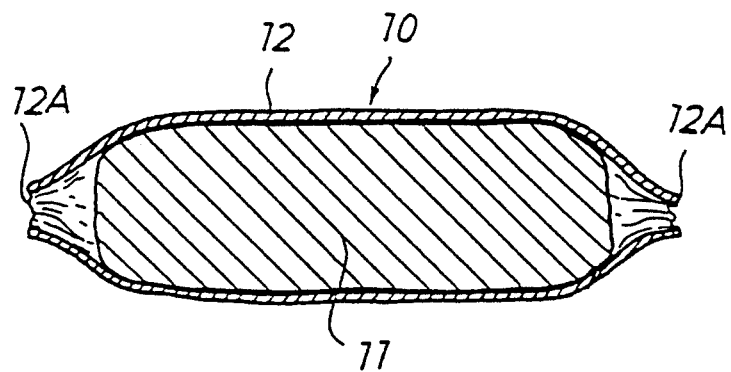
FIG. 7 is a sectional view showing a wrapped food immediately before it is formed into a spindle shape by the manufacturing apparatus of FIGS. 2 and 3.

The cylindrical food 10A to be loaded on the endless conveyor device of the manufacturing apparatus is something like the one having the extra portions at both ends of the membraneous food 12 as shown in FIG. 5, which is formed by depositing, as shown in 4, the filling material 11 on and along one end in the longitudinal direction of the membraneous food 12 having a longer width than the length of the filling material 11, and rolling it into the membraneous food 12 toward the other end of the membraneous food 12.

The filling material 11 is not particularly limited as long as it is prepared in a state having such hardness that it can be wrapped with the membraneous food 12 and both end portions thereof can be squeezed by being rotationally moved with both end portions thereof sandwiched between and pressed by the guide portions 24, 24 and the inclined portions 25, 25 of the stationary resistance plate 23 while it is being transferred on the endless belt 12. Examples of such filling material 12 are sweet potato, butter cream, jam, potato salad and the like.

The above membraneous food 12 is not particularly limited unless thickness, size, shape, and ratio of use with respect to the filling material 11 jeopardize the feel of eat and as long as it is not damaged when both end portions thereof are rolled up. Examples of such membraneous food 12 are a crust of crepe which is composed chiefly of wheat flour and secondarily of egg, oil, fat, salt, sugar, milk, water, etc. added thereto, kneaded and baked into a membraneous state, egg fried into a membraneous state, and the like.

A preferred ratio of use of the wrapped food 10A with respect to the membraneous food 12 is 5~20 wt. part with respect to 100 wt. part of the filling material 11. A preferred component of the membraneous food 12 is as follows.

Wheat flour: 100 wt. part
Egg: 20~80 wt. part
Fat and oil: 20~50 wt. part
Sugars: 15~80 wt. part
Water: 60~100 wt. part In the embodiment of the present invention using the above manufacturing apparatus, the filling material 11 and the membraneous food 12 were prepared by uniformly mixing the following materials at the following ratios.

Membraneous Food

Wheat flour: 100 wt. part
Whole egg: 55 wt. part
Good white sugar: 30 wt. part
Liquid oil: 25 wt. part
Non-fat dry milk: 10 wt. part
Salt: 0.5 wt. part
Water: 100 wt. part

Filling Material

Heated sweet potato: 100 wt. part
Good white sugar: 30 wt. part
Egg yolk: 5 wt. part
Margarine: 5 wt. part
Raw cream: 4 wt. part Such prepared membraneous food 12 was baked into a membraneous state having a thickness of about 0.5 mm using a drum baker (not shown) and cut into a rectangular shape having a side of 12 cm. After such prepared filling material 11 had been deposited in a predetermined position of this membraneous food 12 by a depositor (not shown), it was rolled up into a cylindrical wrapped food 10A.

Subsequently, when the cylindrical wrapped food 10A is loaded on the endless belt 21 of the endless conveyor 20 along the upstream end thereof (see FIGS. 2 and 3), the cylindrical wrapped food 10A is transferred, while being rotationally moved, in accordance with the rotational driving of the endless belt 21. At this time, both end portions of the wrapped food 10A are pushed upward by the guide portions 24, 24 at both edges of the endless belt 21, and both edge portions of the cylindrical wrapped food 10A are squeezed while both end portions of the wrapped food 10A are being pressed down by the respective inclined portions 25, 25 of the stationary resistance plate 23 disposed above the guide portions 24, 24 respectively. With the progress of this squeezing operation, the auxiliary right and left resistance portions 26, 26 disposed between the guide portion 24 and the inclined portion 25 are brought into contact with both ends of the extra portions of the wrapped food 10A and catch the extra portions 12A, 12A to cause them twisted, thereby to roll the extra portions 12A, 12A into both end portions of the wrapped food 10A. With a further progress of rotational movement of the wrapped food 10A, next right and left auxiliary resistance portions 26, 26 are likewise brought into contact with both end portions of the wrapped food 10A to cause them twisted, thereby to roll the extra portions 12A, 12A further into both end portions of the wrapped food 10A. In this way, by the time the wrapped food 10A reaches the downstream end of the endless belt 21, the extra portions 12A, 12A are surely rolled into both end portions of the wrapped food 10A, thus forming the spindle-shaped wrapped food 10 shown in FIG. 1. In such formed spindle-shaped wrapped food 10, since the membraneous food 12 is squeezed by twisting together with the filling material 11, the membraneous food 12 is never restored to its original shape. In such manufacturing process, the wrapped food 10 was not changed in quality and was excellent in color and shape. By heating, cooling or coating in accordance with necessity, the wrapped food 10 can be manufactured as merchandise having a stable shape.

The present invention is by no means limited to the above embodiment. Instead, it suffices as long as it is an apparatus for manufacturing a spindle-shaped wrapped food by squeezing both end portions of a cylindrical wrapped food having an extra portion at each end of a membraneous food with a filling member enwrapped therein using an apparatus including an endless conveyor device, a stationary resistance plate juxtaposed along and above the endless conveyor device, and a pair of auxiliary resistance portions disposed in gaps formed in both side edges of the stationary resistance plate and endless belt respectively, a space formed between the endless conveyor device and the stationary resistance plate being of a generally spindle shape in section, the process for manufacturing a wrapped food comprising the steps of exerting a rotational movement to the cylindrical wrapped food by the endless conveyor device and stationary resistance plate during the time the cylindrical wrapped food is being transferred on the endless conveyor device, and causing the auxiliary resistance portions to contact the respective extra portions at both end portions of the membraneous food to exert resistance to the rotation to thereby twist the extra portions in order to roll both extra portions in both end portions of the wrapped food. Further, various component parts of the manufacturing apparatus used in the present invention can be suitably redesigned according to necessity.

What is claimed is:

1. An apparatus for manufacturing a spindle-shaped wrapped food by squeezing both end portions of a cylindrical wrapped food (10A) having an extra portion at each end of a membraneous food (12) with a filling material (11) enwrapped therein, said apparatus comprising an endless conveyer device (20) having a mechanism for pushing up both edges of an endless belt (21) whereby said edges are inclined, a stationary resistance plate (23) juxtaposed along and above said endless belt (21) of said endless conveyor device (20) and having a downwardly inclined portion (25) at each end thereof, and a pair of auxiliary resistance members (26) directed toward gaps (S) between both side edges of said stationary resistance plate (23) and both side edges of said endless belt (21) respectively, there being a gap between said endless belt (21) and said stationary resistance plate (23), said gap being of a generally spindle shape in section.

2. The apparatus for manufacturing a wrapped food as claimed in claim 1, wherein there are plural said pairs of auxiliary resistance portions (26) spaced apart in the direction of travel of said endless belt (21) and disposed in said gap (S).

3. The apparatus for manufacturing a wrapped food as claimed in claim 1, wherein the entire surfaces of said endless belt (21), said stationary resistance plate (23) and said inclined portions (25) are provided with needle-shaped projections (27).

4. The apparatus for manufacturing a wrapped food as claimed in claim 1, wherein said stationary resistance plate (23) is horizontal and is adjustably fixed by fastening means (29) at opposite ends thereof with respect to cradles (28) disposed at opposite sides of said endless belt (21).

* * * * *